(12) United States Patent
Gerstenmeier

(10) Patent No.: US 12,440,698 B2
(45) Date of Patent: Oct. 14, 2025

(54) DEVICE FOR BIOSTIMULATING PHOTOTHERAPHY

(71) Applicant: JK-HOLDING GMBH, Windhagen (DE)

(72) Inventor: Jürgen Gerstenmeier, Neuweid (DE)

(73) Assignee: JK-Holding GMBH, Windhagen (DE)

( * ) Notice: Subject to any disclaimer, the term of this patent is extended or adjusted under 35 U.S.C. 154(b) by 343 days.

(21) Appl. No.: 17/600,647

(22) PCT Filed: Apr. 2, 2020

(86) PCT No.: PCT/IB2020/053146
§ 371 (c)(1),
(2) Date: Oct. 1, 2021

(87) PCT Pub. No.: WO2020/202063
PCT Pub. Date: Oct. 8, 2020

(65) Prior Publication Data
US 2022/0161049 A1    May 26, 2022

(30) Foreign Application Priority Data
Apr. 3, 2019   (CH) .................................. 00453/19

(51) Int. Cl.
*A61N 5/06* (2006.01)
*A61B 5/00* (2006.01)
(Continued)

(52) U.S. Cl.
CPC .... *A61N 5/0614* (2013.01); *A61N 2005/0626* (2013.01); *A61N 2005/0661* (2013.01); *A61N 2005/0663* (2013.01)

(58) Field of Classification Search
CPC .......... A61N 5/0614; A61N 2005/0626; A61N 2005/0661; A61N 2005/0663;
(Continued)

(56) References Cited

U.S. PATENT DOCUMENTS

2004/0232359 A1    11/2004   Fiset
2007/0276455 A1    11/2007   Fiset
(Continued)

FOREIGN PATENT DOCUMENTS

CN    108109692 A    6/2018
KR    100768898 B    10/2007
(Continued)

OTHER PUBLICATIONS

German International Search Report and English Translation for International Application No. PCT/IB2020/053146, mailed Jun. 2, 2020, 9 pages.

*Primary Examiner* — Benjamin J Klein
*Assistant Examiner* — Vynn V Huh
(74) *Attorney, Agent, or Firm* — HESLIN ROTHENBERG FARLEY & MESITI P.C.

(57) ABSTRACT

The invention relates to a device (1) for biostimulating phototherapy, in particular in conjunction with a therapy apparatus (50). The device comprises at least one first light-emitting unit (4.1, 4.2) for directly and/or indirectly applying light of a first wavelength to at least one part of a human or animal body, and a control unit (2) for outputting application routines. The device also comprises a module interface (3.1, 3.2) for operatively connecting the control unit to the at least one first light-emitting unit (4.1, 4.2), and a core interface (5) for operative connection to a therapy apparatus (50). The control unit (2) is designed such that it is able to receive data via the core interface (5) and, on the basis of these data, is able to control the output of an application routine via the module interface (3.1, 3.2). The invention also relates to a therapy apparatus fitted with the device according to the invention, for physical treatment of a patient using supplementary biostimulating phototherapy, to a method for operating a device according to the invention (Continued)

and to a computer program product for executing this method.

25 Claims, 1 Drawing Sheet

(51) Int. Cl.
*A61M 21/00* (2006.01)
*A61M 21/02* (2006.01)
*A61N 5/067* (2006.01)

(58) Field of Classification Search
CPC .... A61N 2005/0642; A61N 2005/0651; A61N 2005/0659; A61N 2005/0662; A61N 5/0618; A61N 5/0616; A61N 5/0613; A61N 2005/0658; A61N 5/067; A61N 2005/0615; A61N 2005/0632; A61N 5/06–2005/073; A61B 5/441; A61B 18/20–18/28; A61M 21/02; A61M 2021/0044; A61M 2205/051
USPC ..................... 606/2–19; 607/88–94
See application file for complete search history.

(56) References Cited

U.S. PATENT DOCUMENTS

| | | | |
|---|---|---|---|
| 2009/0005839 A1 | 1/2009 | Griffith et al. | |
| 2011/0313786 A1 | 12/2011 | Fishman | |
| 2012/0065709 A1 | 3/2012 | Dunning et al. | |
| 2013/0184693 A1* | 7/2013 | Neev ................. | A61N 5/0616 606/9 |
| 2016/0325109 A1 | 11/2016 | Knaus et al. | |
| 2018/0214663 A1* | 8/2018 | Ueno ................. | G06F 3/147 |
| 2019/0083202 A1* | 3/2019 | Brawn ............... | A61C 8/0006 |

FOREIGN PATENT DOCUMENTS

| WO | WO 2006108093 A2 | 10/2006 |
|---|---|---|
| WO | WO 2015200380 A1 | 12/2015 |
| WO | WO 2018026680 A1 | 2/2018 |

* cited by examiner

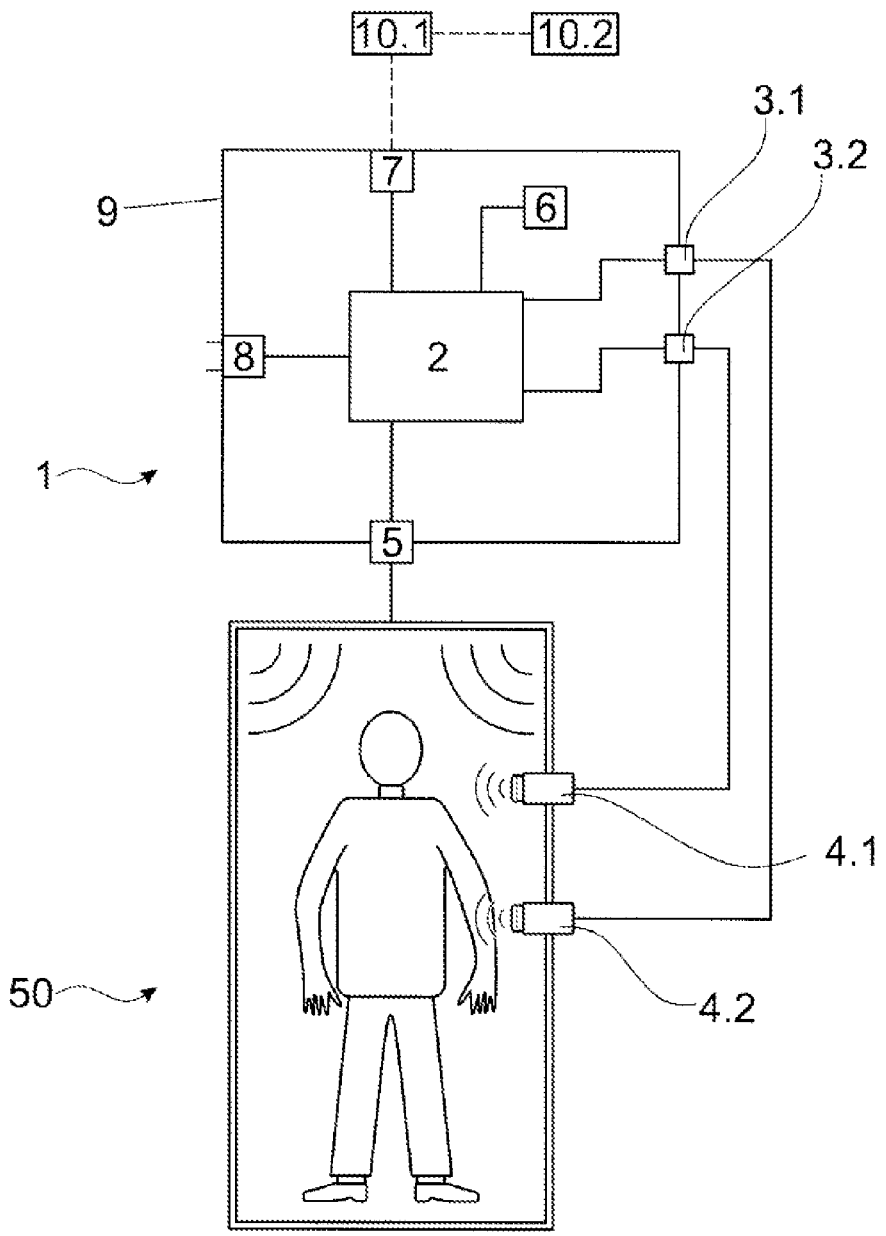

DEVICE FOR BIOSTIMULATING PHOTOTHERAPHY

This application is a national stage entry under 35 U.S.C. § 371 of International Application Number PCT/IB2020/053146, filed Apr. 2, 2020, and claims priority to Swiss application CH 00453/19, filed Apr. 3, 2019, the entire contents of which applications are hereby incorporated herein in their entireties.

The present invention relates to a device for biostimulating phototherapy, in particular for supplementary biostimulating phototherapy in conjunction with a therapy apparatus. It also relates to a therapy apparatus fitted with the device according to the invention for physical treatment of a patient using supplementary biostimulating phototherapy, to a method for operating a device according to the invention, and to a computer program product for executing said method, all according to the preambles of the independent claims.

TECHNICAL BACKGROUND

Numerous light-therapy applications have been known for quite some time. In particular, skin diseases have already been successfully treated using phototherapeutic means, wherein the treatment of psoriasis, acne and eczema is already established practice. Depending on the treatment method, a light composition having a certain intensity, dose, wavelength and bandwidth which is expedient for the intended treatment effect is selected. In principle, a treatment success exists if the treated tissue also at least partially absorbs the applied radiation. In addition to the effects which can thus be ascribed to the light application itself, any heat generated can also achieve the treatment effect. Systemic effects which to date have not yet unequivocally been explained in terms of causation can be triggered by light application. Thus, certain theories are based on the local application of long-wavelength light being capable of inducing increased ATP production. Thus, for example, treatments in the range of the red and near-infrared range are known, in which long-wavelength spectral ranges are applied in order to achieve a physiological effect.

In addition to the meanwhile well researched direct effects of light therapies on the skin or in the immediate proximity of the exposed skin surface, approaches involving the systemic effects of applying light have increasingly here become the focus of attention.

Thus, for example, there are extensive scientific studies dealing with the problems of seasonally triggered affective disorders based on the insufficient exposure to light in the daylight spectrum in the acute months, that is to say, in the winter months. However, exposure to irradiation alone using lighting means similar to daylight alone appears to provide only insufficient relief. Thus, for example, the Swedish Council on Technology Assessment in Healthcare, in a study "Light Therapy for Depression, and Other Treatment of Seasonal Affective Disorder—A Systematic Review" (Revision of Chapter 9 in SBU report, 2004, No. 166/2), published in 2004, reaches the conclusion that, in the case of seasonal mood swings, no conclusive statement on the efficacy of an isolated monotherapeutic treatment with light can be made.

For the application in the cosmetic context for skin rejuvenation and regeneration, which are known to date, the results are also contradictory. Nonetheless, on the basis of numerous positive reports and studies in this sector, it is unquestionable that applying light in the spectral range of wavelengths above 380 nm to a body is capable of triggering physiological and in particular psychosomatic effects.

Thus, in this sector, there is a need to offer application fields of photobiological treatments which benefit from the positive effects of photobiological stimulation, such as, for example, the good skin tolerance and the positive effects on the hormonal metabolism of the body. In particular, the applications in the sector of low-level laser therapy and the application of red light and light in the near-infrared range are very promising and have numerous physiologically desirable effects.

DESCRIPTION OF THE INVENTION

Thus, an aim of the present invention is to provide a device, a method and finally an improved therapy apparatus which can benefit from the positive effects of biostimulating phototherapy and thereby enables an efficient use of an already existing therapy apparatus. A particular aim of the present invention is to provide a device which has a modular design and which can be used as an addition to an existing therapy device and which enables biostimulating phototherapies which are adapted to the underlying physical therapy and achieve synergistic effects with said therapy. Another aim of the present invention is to overcome at least one disadvantage of the known devices.

This (These) aim(s) has (have) been achieved with a device for biostimulating phototherapy, with a therapy apparatus for physical treatment of a patient, and with a method for operating a device for supplementary biostimulating phototherapy and with an associated computer program product, in each case according to the characterising portion of the independent claims.

One aspect of the present invention is a device for biostimulating phototherapy. Preferably, the device for biostimulating phototherapy is designed to be used in conjunction with a therapy apparatus. The device comprises at least a first light-emitting unit for directly and/or indirectly applying light of a first wavelength to at least one part of a human or animal body. The device also comprises a control unit for outputting application routines. According to the invention, the device also comprises a module interface for operatively connecting the control unit. The device also comprises a control unit for outputting application routines. The device according to the invention also comprises a module interface for operatively connecting the control unit to the at least one first light-emitting unit.

In a particular embodiment, the device comprises a plurality of light-emitting units.

According to the invention, the device also comprises a core interface for operative connection to a therapy apparatus. The control unit is designed to receive data via the core interface and, on the basis of these data, to control the output of an application routine via the module interface.

In the context of the invention, a biostimulating phototherapy can be understood to be an application of light in a wavelength range between 380 nm and 1400 nm, in particular between 380 nm and 1100 nm, wherein, by the application to the body or to at least one part of a human or animal body, a physiological effect is achieved and/or the application can trigger a psychosomatic effect. In both modes of action, a biostimulating effect according to the invention can be acquired objectively by blood analysis and/or subjectively by interview and/or anamnesis. In the context of the present invention, a biostimulating phototherapy can be understood to be an application of light of which the physiological effect can be detected only after a time delay. In contrast to biostimulating phototherapies with UV radiation, in which a tanning and/or reddening effect occurs immediately or at least within a manageable time period, in biostimulating therapy, in the present context, such a tanning and/or reddening effect can be detected only after some time, in particular within a time period of one to 14 days, via a physiological effect. Sometimes, the biostimulating phototherapies are also of psychosomatic nature and lead to an emotional state which makes a treatment session tolerable, without specific physiological values that can be measured without excessive effort being influenced in the process. In an alternative view of the biostimulating phototherapy, a directly detectable physiological effect can certainly be detected, in that, for example, a reddening of the skin can be detected, which can be the consequence of a change in blood flow in the exposed tissue.

Without being bound in terms of the scope of the present invention to this theory, it can be assumed that the biostimulating phototherapy in some embodiments is capable of triggering a signal cascade in the body, which leads to a delayed, but under some circumstances lasting, physiological effect. Desired effects of the biostimulating phototherapy can be selected from the group consisting of: pain relief, anxiety relief, improved blood flow, in particular improved peripheral blood flow, skin smoothing, immunomodulating/immunostimulating effects, vigilance, elimination of difficulties initiating and/or maintaining sleep, decrease of irritability, jet lag and/or similar disorders of the circadian rhythm, varicose veins, muscle tensions, muscle cramps, strains and other forms of dull trauma, healing and improvement of the structure of scar tissue, menstrual complaints, migraines and other forms of head and/or limb pains, for treatment and relief in arthritis, arteritis, Raynaud's syndrome, eczema and/or other inflammatory skin diseases such as, for example, acne, psoriasis and symptoms of neurodermatitis, chemical burns and/or burns of the skin, depressive mood disorders, vitamin D deficiency, colds, including chronic and/or acute obstructive narrowing of the nasal and/or oral and throat mucosal membranes, bronchial spasms, nervous ticks, concentration disorders and attention deficit disorders such as ADD and ADHD, excessive and/or undesired unpleasant odoriferous body excretions, excessive perspiration, halitosis, etc.

In the context of the present invention, a therapy apparatus can be understood to mean a device which is used for the physical treatment of a patient and pursues a specific treatment goal. According to the invention, such therapy apparatuses are: massage apparatuses which act by physical action on the body and/or body part to be treated, therapeutic baths, ultrasound apparatuses, electrostimulation apparatuses, baths and bath tubs with corresponding therapy functions such as, for example, massage nozzles, vibration plates for physical action on the body and/or a part of the body, inhalation and vapor bath apparatuses as well as UV radiators such as, for example, tanning apparatuses. It is obvious to a person skilled in the art that the therapy apparatuses listed here represent an exemplary selection of possible therapy apparatuses, by which the device according to the invention can achieve its purpose, without this selection being understood to be comprehensive.

By the device according to the invention, it is possible to operate a biostimulating phototherapy in a therapy apparatus as an operative unit, so that, between the therapy apparatus and the biostimulating phototherapy, a synergistic effect can be generated, which can be in addition to the treatment goal, in particular also by rendering the treatment overall more pleasant or more easily tolerated for the therapy recipient, and/or by contributing additional added value in the treatment context. All the treatment types of the therapy apparatuses mentioned here have in common that the treatment can extend over a certain time period. Accordingly, it is advantageous to provide the control unit for outputting application routines. By said application routines, the treatment duration, for example, of the therapy apparatuses, can be used in order to obtain a specific treatment goal which can be defined beforehand and/or an additional use, as just mentioned, by means of the biostimulating phototherapy. Here, the device according to the invention can be brought in direct operative connection with the therapy apparatus, in that, via a core interface, the device can be connected to the therapy apparatus and a data exchange is enabled. This can lead, for example, to the device according to the invention being able to adapt, on the basis of the data received via the core interface, the output of the application routine to the treatment goal and/or to the desired additional use.

Another advantage of the device according to the invention for biostimulating phototherapy is the modularity of the device. Using the interface, it is possible to adapt the device to the application with different therapy apparatuses. The most modern therapy apparatuses in the age of the "Internet of Things" already have numerous interfaces, on the one hand, for being operated and maintained by means of a control unit, and, on the other hand, for acquiring treatment sequalae, recording them, and, if need be, exchanging them in a network with other apparatuses and/or computers. It would be easy to adapt such an interface in order to be connected to a core interface of a device according to the invention.

In the context of the present invention, a light-emitting unit can be understood to be, in its simplest design, a unit capable of generating visible light from an electrical current. In the context of the present invention, a light-emitting unit can be designed as a single light source or it can be formed from interconnected modules.

In a particular embodiment, the light-emitting unit comprises a lighting means selected from the group consisting of: incandescent lights, light-emitting diodes, arc lamps and/or gas discharge lamps.

In the context of the present invention, a direct application to at least one part of a human or animal body can occur if there is no obstacle between the emission of the light and the body and the emitted light strikes the body directly. Accordingly, an indirect application can occur, if reflectors, for example, or other reflecting surfaces lead to the emitted light striking the surface to be exposed via a detour.

In a particular embodiment, the device according to the invention comprises a plurality of light-emitting units for directly and/or indirectly applying light of a wavelength to at least one part of a human or animal body. Preferably, this involves a plurality of identical light-emitting units. For example, the device can be fitted with arrays which comprise a plurality of light-emitting diodes. In these arrays, various diodes can be fitted in order to emit light of a certain spectrum.

The desired bandwidth of the entire light-emitting unit can here be composed of a plurality of diodes with different wavelengths. These spectra of the diodes can be selected under production control via the doping of the diodes by a person skilled in the art according to the specific requirements of the phototherapy to be achieved.

In a particular embodiment of the device according to the invention, the module interface is designed for operatively connecting the control unit to the plurality of light-emitting units for directly and/or indirectly applying light of a first wavelength to at least one part of a human or animal body. Thus, for example, in a design according to the invention, the module interface can be used to operatively connect a plurality of identical light-emitting units to the control unit. In the context of the present invention, there can be an operative connection between the control unit and the one or more light-emitting units when signals of the control unit lead to the generation of a corresponding light emission by the light-emitting unit(s).

In an alternative embodiment, the device comprises a plurality of module interfaces, for example, in order to operatively connect in each case one light-emitting unit of a plurality of light-emitting units to the control unit.

Alternatively or additionally, a module interface can be provided, which in each case is used for a certain type of light-emitting units. In this embodiment, for example, all or multiple light-emitting units of the same type can be operatively connected via a module interface to the control unit. Here, combined apparatuses, in which multiple different light-emitting units are present, can in each case be fitted with a plurality of adapted module interfaces, which in each case can be connected to a certain type of light-emitting units. It is conceivable that thereby the advantages of the modularity of the device according to the invention can be further developed in that, for example, independently of the lighting means, the control unit can output via the corresponding interface a supplementary biostimulating phototherapy as application routine in accordance with the therapy apparatus.

In an embodiment according to the invention, outputting an application routine is understood to mean that the control unit outputs a control signal allowing the emission of duration, intensity, total dose, wavelength, bandwidth, etc., of an application session via the light-emitting unit, so that the treatment by the therapy apparatus is optimally supplemented by means of a corresponding biostimulating phototherapy.

In a particular embodiment of the present invention, an application routine is designed so that it is emitted in the form of a light program via the at least one light-emitting unit and/or the plurality of light-emitting units as light spectrum, in particular over a certain time period. Preferably, the light spectrum comprises light with a wavelength between 380 and 1400 nm, preferably between 380 and 1100 nm, particularly preferably between 380 and 780 nm.

In a particular embodiment, the device is accommodated in a housing, on the housing outer wall of which at least one module interface is provided. This module interface is connected to a light-emitting unit which, with respect to the device, can be shifted with the control unit. Thus, for example, the control unit with all its other components and the interfaces can be positioned separately from the light-emitting units, as a self-contained element. This can be useful, for example, when the device according to the invention can be accommodated in an existing therapy apparatus or in a housing of an existing therapy apparatus. The light-emitting units can be connected by means of cable guides to the module interfaces, so that they can be operatively connected to the control unit. The light-emitting units can then be positioned so that they enable an optimal exposure of the human or animal body or at least a part thereof.

In a particularly preferred embodiment, the light-emitting units are mounted movably, for example, via at least one slide bearing or via a linear drive, in order to assume a corresponding light-emitting position during operation, which is then used for optimal exposure of the at least one part of a human or animal body.

An additional advantage of this design of the device according to the invention can consist in that existing designs of therapy apparatuses do not have to be adapted excessively. The light-emitting units can then be accommodated, for example, in a correspondingly space-saving manner, directly at the application site, and the control unit can be accommodated separately in another region of the therapy apparatus.

In a particular embodiment, the light-emitting unit can be operatively connected by a wireless operative connection via the module interface to the control unit. Due to the usually energy-intensive biostimulating phototherapy, it can be advantageous in this embodiment to provide either a separate current connection for the light-emitting units or to provide said light-emitting units with a rechargeable battery or a battery which allows at least a certain time period of operation.

In a particular embodiment, the light spectrum consists of light of different wavelengths and relative intensity. Preferably, the light spectrum has a proportion of relative intensity of at most 25% of light of a wavelength between 380 and 400 nm and at most 50% of a wavelength between 500 and 550 nm. Thereby, for example, a light spectrum of morning sun and/or evening sun can be simulated. By the corresponding composition of the spectrum, it can be possible to associate the treatment by means of the therapy apparatus with the corresponding lighting atmosphere. This can be used, for example, in order to counteract therapy apparatuses which otherwise have an exciting and/or an activating effect so that they nevertheless have a relaxing effect, in that a soothing atmosphere is generated by means of the light spectrum.

In a particular embodiment, the light spectrum has a relative intensity proportion of at least 75% of light of a wavelength between 380 and 450 nm and a proportion of relative intensity of at most 50% of light of a wavelength of 650 nm. This spectrum can be encountered, for example, with the corresponding characteristic values, inside a forest. In forest shadows, the crowns of the trees overlap and form a dense leaf canopy which is broken by only a few gaps. Only light filtered by such a leaf canopy reaches the ground. The light colour is greenish to yellow green. Such a spectrum demonstratively has a positive influence on mood, as during a walk in the woods.

In a particular embodiment, the light spectrum has a spectral distribution with at least one of the following properties: peak between 520 and 570 nm, preferably at 550 nm, with an intensity which is between 2 and 5 times stronger than the other ranges and/or in the near-infrared range, i.e., in the wavelength range between 740 nm and 820 nm, an intensity at least 4 times greater than the peak at 520 to 570 nm, preferably 550 nm.

In a particular embodiment, the light spectrum has a spectral distribution with maximum relative intensity in the range of actinic light, wherein, for example, wavelengths in the range of blue and violet light can predominate.

In a particular embodiment, this spectrum has a peak at approximately 550 nm and a rise at 680 nm. Corresponding tailored light spectra can be composed, in order to achieve a desired psychosomatic and/or physiological effect.

In a particular embodiment, the device according to the invention comprises a light-emitting unit which is designed to emit light in a spectrum between 570 nm and 850 nm. Preferably, the light-emitting unit is designed to emit light in a red spectrum or in a near-infrared spectrum.

In a particular embodiment, the application routine comprises applying light to at least one part of a human or animal body over a time period. Preferably, the time period is determined by the control unit by means of the data which are received via the core interface. Most particularly preferably, this time period is adapted to a time period of the therapy apparatus. The biostimulating phototherapy can also be used, for example, in order to make the time period more fun for the therapy recipient. For this purpose, the biostimulating phototherapy can emit, for example, an initially soothing evening spectrum determined, for example, by the above method, in order to generate a mild sedating effect in the therapy recipient. Toward the completion and end of the therapy session, the light spectrum can then be adapted, in that, for example, the blue component is increased, and thus the therapy recipient transitions from the sedated atmosphere generated during a therapy session into an active and activated emotional state. This application is particularly interesting for therapy apparatuses which can have a calming and/or relaxing effect on the therapy recipient due to their therapeutic action, such as, for example, massage apparatuses, baths, automatic tanning apparatuses, etc.

In an additional or alternative embodiment, the time period of the biostimulating phototherapy can be designed to be longer or shorter than the therapy duration. This can be the case, for example, when the biostimulating phototherapy is designed to facilitate the entry into the therapy session or to generate a supplementary effect after the therapy session. In an additional particular embodiment, the time period of the biostimulating phototherapy is designed as run preceding and/or following the therapy duration. The control unit is designed to output an application routine based on the therapy duration, which starts before the beginning of the therapy duration and stops after the end of the therapy duration.

Thus, it was found surprisingly that a preceding run with application routines comprising a spectrum whose peaks lie primarily in the red and/or in the near-infrared range reinforces the tanning effect of a UV tanning installation.

In a particular embodiment which can be used in the context of tanning installations, the time period of the biostimulating phototherapy is designed to be particularly short, so that, for example, within a tanning installation, a device according to the invention can be provided, which, as biostimulating effect, is supposed to force a therapy recipient to close his/her eyes, in that, for example, the device, via the control unit, outputs an application routine which emits, via the light-emitting unit, a light spectrum which can be tolerated only with difficulty with open eyes, so that the therapy recipient experiences an eye closure reflex. This can be useful particularly in a setting in which tanning installations emit strong UV rays, in order to prevent damage to the eyes.

In a particular embodiment, the device comprises a plurality of light-emitting units for directly and/or indirectly applying light of a wavelength to at least one part of a human or animal body, and said device is designed so that it comprises light-emitting units which generate different wavelengths. Particularly preferable are light-emitting units designed so that the different wavelengths are suitable for generating different biostimulating phototherapies.

In a particular embodiment, the light-emitting units are designed for emitting pulsed light, wherein the pulsing is carried out preferably with a frequency range between 90 and 400 Hz, particularly preferably wherein the pulsing has a frequency selected from the group consisting of 97 Hz, 194 Hz or 388 Hz.

In a particular embodiment, the light-emitting units are designed for emitting Low Level Laser Light (LLLL). For this purpose, for example, laser diodes can be provided, which are each designed to emit light of a certain wavelength. Particularly suitably, laser diodes with different wavelengths can be provided. Without being bound to the theory, low level light laser can generate biophysical tissue stimulations, namely in a non-ablative, non-invasive manner, in that cell tissue is simulated by light and metabolic processes can be initiated.

In a particular embodiment, for each desired specific wavelength of a LLLL, a certain light-emitting unit is provided. In accordance with the above-mentioned embodiments, said light-emitting units can be operatively connected to the control unit by means of a common module interface or in each case with a separate module interface.

In a particular embodiment, the control unit is designed to take into consideration additional data. Preferably, these data are selected from the group consisting of: time-of-day data, weather data, patient data, apparatus data, etc. These data can then be taken into consideration for outputting application routines. Thus, the application routines can be adapted, for example, on the basis of the time of the day in the above-described manner, so that application routines cannot lead to a disturbance of the circadian rhythm of a therapy recipient.

In an additional embodiment, the output of the application routine can be generated by the control unit based on predefined user settings or profiles. Thus, in the Swiss patent application of the same applicant, entitled "Parametrisierte Betriebsumgebung für Bestrahlungen [Parameterized Operating Environment for Irradiations]" with the filing date of Apr. 3, 2019, Reference P100444CH and application number CH00454/19, devices are described which can advantageously be fitted with a device according to the invention. Thus, for the supplementary biostimulating phototherapy as well, user-specific wishes and settings can be taken into consideration and an optimal treatment can be offered.

Particularly preferably, the device according to the invention therefore comprises at least one date and time unit which can give these corresponding data to the control unit. In addition, the device according to the invention can receive corresponding weather data by means of a network connection and also take them into consideration as well when outputting the application routine.

Particularly preferably, patient data and apparatus data for outputting application routines are taken into consideration by the device according to the invention. The patient data can, for example, be made available via a third-party apparatus or a network connection, and the device according to the invention can be designed, for example, via a machine learning module, to establish, based on acquired patient data, an optimal application routine which is synergistic for the desired therapeutic effect of the therapy apparatus, or can also be helpful for reducing side effects. Likewise, it is advantageous if the control unit is capable of retrieving corresponding apparatus data from the therapy apparatus, so that the device can, for example, adapt the application routine to the apparatus parameters and the apparatus geometry.

It is conceivable that, for example, the device according to the invention is fitted with a control unit which comprises a database of therapy apparatuses and which is capable of retrieving the corresponding drivers directly from this database to therapy apparatuses for the correct biostimulating phototherapies. This embodiment is advantageous particularly for a design with high modularity, as described at the start.

In a particular embodiment, the device comprises an input device for acquiring input data. It is particularly preferable then for the control unit to be also designed to take into consideration these input data for outputting application routines. This can be used, for example, for a manual override of a certain application routine, which the device automatically establishes on the basis of the therapy apparatus and the treatment to be achieved, but which in any event may not be wanted in this form by operating personnel or the therapy recipient. It is also possible to also include an output device in addition to the input device, so that a corresponding visual representation of the input data and of the work of the device according to the invention can be displayed. Particularly preferably both the input device and the output device are a touch-sensitive screen as conventionally used for smartphones or other digital devices.

In a particular embodiment, the device according to the invention also comprises at least one biosensor for acquiring physiological parameters of a patient.

Particularly preferably, the device according to the invention comprises a non-invasive biosensor. Such a biosensor can, for example, be designed to detect a skin type of a therapy recipient by optical detection. It is also conceivable that oxygen saturation or other physiological parameters which can be acquired by means of optical detection can be acquired by such a biosensor. Such biosensors are commercially available and can be selected by the competent person skilled in the art for the specific application without problem. However, in the context of the present invention, it is advantageous if this biosensor can transmit these data to the control unit, so that they can be taken into consideration for outputting the application routine. In a particular embodiment, these biosensors remain in use over the time period of the biostimulating phototherapy, and the corresponding physiological parameters of the therapy recipients are transmitted in real time to the control unit, so that, if need be, said control unit can intervene directly in the application routine and carry out corresponding dynamic adaptations.

In a particular embodiment, the control unit is designed so that it is able to dynamically adapt the application routines by feedback of measured physiological parameters.

In a particular embodiment, the light-emitting units comprise light-emitting diodes. Particularly preferably, the light-emitting units comprise light-emitting diodes which are designed by their doping to emit light of a certain wavelength.

In an additional particular embodiment, the light-emitting units comprise monochromatic light-emitting diodes in an array. In the context of the present invention, monochromatic light-emitting diodes are understood to mean light-emitting diodes which have a fixed light spectrum and wherein only the intensity can be varied. The LEDs used can here be selected in a targeted manner for the desired function/effect.

In a particular embodiment, the control unit is designed to be able to output a specific application routine adapted to the respective part of the body. For this purpose, in the device according to the invention, sensors can be provided, which are capable of acquiring by optical means, for example, parts of the body and contours. Alternatively or additionally, a capacitive detection and/or an impedance measurement can be used for the corresponding detection. Suitable means for detecting a part of the body automatically are known to the person skilled in the art.

In an additional particular embodiment, the light-emitting units comprise different monochromatic light-emitting diodes in an array. In the context of the present invention, different monochromatic light-emitting diodes can be understood to be light-emitting diode arrays which have multiple fixed light spectra which can each be varied in terms of their intensity. Here too, the LEDs used can be selected in a targeted manner for the desired function/effect.

In an additional particular embodiment, the light-emitting units comprise polychromatic light-emitting diodes. In the context of the present invention, polychromatic light-emitting diodes are understood to mean light-emitting diodes which have "polychromatic" LEDs which in turn comprise individual monochromatic light sources which are positioned spatially in the immediate proximity on an electrical component and which can each be varied in terms of their intensity. As a result of this proximity, a mixture of the individual intensities arises for the observer, generating a variable colour perception.

Most particularly preferably, the light-emitting unit comprises light-emitting diodes designed to emit light of a wavelength between 610 to 760 nm.

In the context of the present invention, this is understood to mean not that these spectra are emitted exclusively, but instead that these spectra are substantially primarily emitted, which can lead to a corresponding spectrum having a peak in the mentioned range, while light in adjacent wavelengths can, however, also certainly be present.

In a particular embodiment, the light-emitting diodes are modified by a luminescence layer.

In a particular embodiment, the device comprises a securing means for securing the device on a therapy apparatus. In the context of the present invention, a securing means can be understood to mean a securing hook, a locking closure, a velcro tape, an adhesive tape, a screw closure, an insert compartment, etc., which is designed to connect the device according to the invention by frictional connection to a therapy apparatus.

In a particular embodiment, the light-emitting unit is designed to emit substantially no light of a wavelength of less than 380 nm. Particularly preferably, this means that the relative intensity of UV rays in the spectrum of a light-emitting unit is less than 3%. In the context of the present invention, UV light is understood to mean light which has a wavelength of less than 380 nm.

In a particular embodiment of the present invention, the device comprises a network interface for connecting the control unit to a computer network and/or to one or more additional devices as described.

For some therapeutic apparatuses it may be expedient to incorporate a plurality of devices according to the invention in the apparatus, wherein, on the one hand, each of these devices can be connected to the therapy apparatus via a core interface, and, on the other hand, the devices can also all be interconnected by means of a network interface. As a result, for example, entire arrays of devices according to the invention can be designed to output in each case the same application routine or even different application routines adapted to one another, which are designed to supplement the intended therapeutic effect of the therapy apparatus. Likewise, it would naturally be conceivable that each of the devices connected in this way to another device according to the invention is connected to its own therapy apparatus, and the synergistic effect only occurs due to the interchange of the devices, although each therapy apparatus functions independently of the other.

In a particular embodiment of the present invention, the device comprises a memory unit for storing the data and/or application routines.

In a particular embodiment of the present invention, the light-emitting unit is designed to apply light of high intensity to at least a part of a human or animal body. Particularly preferably, this light is in a certain frequency range. This can occur, for example, via a laser.

With the device according to the invention, in its basic embodiment as well as in its other mentioned preferred embodiments, it is possible to connect a therapy apparatus to a modular biostimulating phototherapeutic apparatus and in the process achieve synergistic effects or at least reduce side effects of the therapy apparatus.

Accordingly, another aspect of the present invention is a therapy apparatus for the physical treatment of a patient. The therapy apparatus is designed to carry out, in addition to the physical treatment, a biostimulating phototherapy on the patient. The therapy apparatus according to the invention comprises a therapy unit for generating external stimulation for therapeutic purposes. The therapy apparatus moreover comprises a device for biostimulating phototherapy, particularly preferably such a device as described at the start.

The therapy apparatus can comprise a therapy unit which is designed for generating external stimulation for therapeutic purposes and for a therapeutic purpose selected from the group consisting of: extension therapy, ergotherapy, sports therapy, medical training therapy, thermotherapy, massage, hydrotherapy, balneotherapy, electrotherapy, ultrasound therapy, phototherapy, postural drainage and/or vibration.

In a preferred embodiment, the therapy apparatus comprises a plurality of devices for biostimulating phototherapy, as described at the start. The devices are networked, so that they are designed for networked output of application routines.

An additional aspect of the present invention relates to a method for operating a device for supplementary biostimulating phototherapy. This method occurs in connection with a therapy apparatus and is preferably a method for operating a device described at the start.

The method according to the invention comprises the step of receiving data from a therapy apparatus connected via a core interface. Moreover, it comprises the processing of the received data for outputting an application routine. This application routine is designed to be carried out by at least one light-emitting unit of the device for supplementary biostimulating phototherapy for applying light of a certain wavelength to at least one part of a human or animal body. Here, the received data comprise information on at least one of the following variables: time course of a therapy session, treatment goal of a therapy session, number and duration of any therapy sessions that have already occurred, medical condition of the therapy recipient before, after and during the therapy session, emotional state of the therapy recipient before, after and during the therapy session. Here, the application routine is output on the basis of these received data.

An additional or alternative embodiment can provide that the individual therapy apparatuses are connected on order to form a mesh network. This network can be constructed with a common control via wireless radio units or interfaces.

An additional aspect of the present invention relates to a computer program product for executing a method according to the invention on a computer for the control of a device for biostimulating phototherapy. Particularly preferably, this execution comprises a supplementary biostimulating phototherapy in connection with a therapy apparatus.

For a person skilled in the art, it is obvious that all the described embodiments can be implemented in an embodiment of the present invention to the extent that they are not explicitly mutually exclusive.

Below, the present invention will now be described in greater detail based on specific embodiment examples and FIGURES, without, however, being limited to them.

By studying these particular embodiments and FIGURES, additional advantageous embodiments of the present invention can arise for a person skilled in the art.

DESCRIPTION OF THE FIGURE

Based on the following FIGURES, embodiment examples of the invention are described. In the FIGURE, FIG. 1: diagrammatically shows an arrangement with a device according to the invention.

EMBODIMENT OF THE INVENTION

FIG. 1 diagrammatically shows how an embodiment of a device 1 according to the invention for biostimulating phototherapy can be designed. The arrangement is based on a therapy apparatus 50 which is designed to carry out a physical treatment of a patient. For the design shown as an example in FIG. 1, for example, a massage table, a UV tanning apparatus or a therapy tub would be possible as therapy apparatus 50. Thus, the therapy apparatus 50, for example, can be a hydromassage apparatus which applies force to the body by means of massage nozzles and wherein the massage nozzles apply a water pressure jet onto a membrane on which the body lies. Such apparatuses for dry massage by water pressure jet are known, for example, from DE 3925620 C1, where such massage tables are described. Such a therapy apparatus is primarily intended for a relaxation effect, in particular by physical treatment of the body. Thus, for example, a massage can promote blood flow through tissue or a muscle, which, for example, can be helpful for regeneration or in the case of injuries. In the present example, it would then be advantageous, for example, if the relaxing effect could be associated with the corresponding biostimulating phototherapy. Thus, for this specific example, the device for biostimulating phototherapy can, for example, be configured to improve the regeneration of muscle tissue after strain due to exercise.

In the general construction design of FIG. 1, the device 1 for biostimulating phototherapy comprises a control unit 2. The control unit 2 is accommodated within a housing 9. The housing 9 can, for example, be made of two formed parts assembled by positive connection, which are screwed together and consist of plastic or aluminum. In addition, the housing 9 can have corresponding openings, in order to provide certain elements of the device 1 with an outside access. Thus, in the device 1 shown as an example, a network connection 8 is provided, which enables a connection of the device 1 to a current connection. However, it would also be conceivable to operate the device 1 by means of a rechargeable battery or a battery which can be inductively charged and needs no connection. In the present example, the network connection 8 supplies the control unit 2 which can be operatively connected via a core interface 5 to the therapy apparatus 50. In the present case, this operative connection is shown as a line, which can mean that the connection can occur via a cable, for example, a network cable or a USB cable. In a specific application, for example, the operative connection can occur in that a network connection is established between a control unit of the therapy apparatus 50 and the control unit via a core interface. It is obviously understood that this connection can also occur wirelessly by means of a corresponding wireless network. Preferably, in the present exemplary embodiment, the core interface is designed to read machine and apparatus data from the therapy apparatus 50, and, to the extent that they are available, process and therapy data which are characteristic for the therapy forms used. By means of the core interface 5, the device according to the invention can also be connected to a plurality of therapy apparatuses 50. The interface is also designed to send data from the device 1 to the therapy apparatuses 50 and, if need be, to transmit an operational readiness to said therapy apparatus.

The device 1 moreover comprises a network interface 7, in order to connect the control unit to a computer network 10.1, 10.2. This is possible most simply in that the network interface is designed to establish a network connection to a wireless network. For this purpose, the network interface 7 can comprise, for example, a wireless local area network module, in order to establish a wireless connection to the internet. Particularly preferably, this module comprises a microchip with 2.4 GHz 802.11 b/g/n WLAN capacity.

In the present example, the device 1 moreover comprises a memory unit 6 which can be accessed via the control unit 2. The memory card can be a fixed component of the control unit 6, for example, in that it is designed as a working memory unit integrated in the control unit 2. However, the memory unit 2 can also comprise additional memory modules which comprise RAM and/or other working memories. Exchangeable memory elements would also be suitable, such as, for example, a corresponding slot for an SD card. In addition, a USB port can also be provided, which can be fitted with a corresponding stick which can be accessed via the control unit 2 and is used as external memory unit. In the present example, this memory unit 2 is designed to store a number of application routines. The application routines can be stored predefined, so that, on the basis of the determined data, by means of the core interface 5, the control unit can retrieve a corresponding application routine from the memory unit 2 and, if need be, modify and output it. However, it is also conceivable that the application routines 2 are composed individually and that the storage unit 2 is used for recording and storing the generated application routines. Thus, for example, in a device 2 according to the invention, it is possible to retrieve which application routine was output and when. In the present example, the output of the application routines occurs via module interfaces 3.1, 3.2. These module interfaces 3.1, 3.2 are designed to convert the application routine into emission instructions of light-emitting units 4.1, 4.2. In the present example, to continue with the above-mentioned application, the light-emitting units 4.1, 4.2 are light-emitting units designed to generate light in the red and near-infrared range. The light-emitting units 4.1, 4.2 can, for example, be designed to be secured on a corresponding part of the body. Thus, for example, it would be possible to design the light-emitting units as component of an elastic hose which, for example, can be pulled over a limb to be treated. Here, while lying on the therapy apparatus 50 during the hydromassage, the part of the body affected can at the same time be exposed to a biostimulating phototherapy which demonstrably promotes blood flow through the affected limb.

In an embodiment according to the invention, the light-emitting units 4.1, 4.2 can also be designed to be exchangeable. Accordingly, it is advantageous if the lighting means of the light-emitting units are exchangeable. In the present example, the light-emitting units 4.1, 4.2 are capable of being dimmed in terms of light intensity. Such dimmable light-emitting units are possible, for example, by means of LED lamps. In the present example, diodes are also used, which are ideal via their doping for the intended wavelength range. Here, particular attention can be given to avoiding particular wavelengths with potential skin-damaging effect, that is to say, for example, short-wave UV wavelengths.

Example 1

Supplementary Photobiomodulation for Individuals Engaging in Sports

In addition to the above-mentioned embodiment of the device 1 according to the invention, based on the specific example of biostimulating phototherapy in connection with the above-described hydrotherapy apparatus, the sports application will now be described. Here, specifically long-wavelength light in the visible and in the near-infrared range is used. This application can occur before a sports activity, in order to prevent muscle fatigue and to increase the performance capability. After the sports activity, the application is suitable for reducing muscle soreness and increasing regeneration in muscles and connective tissue.

For this purpose, a device according to the invention for biostimulating phototherapy according to the above-mentioned criteria is provided, which is designed to output an application routine over a time period of approximately 20 minutes. The light-emitting units are designed to emit a spectral range between 570 nm and 850 nm. The light-emitting units are arranged over the entire length or over at least a portion of the length of the therapy apparatus 50, that is to say accordingly, in the case of a hydromassage therapy apparatus, opposite the lying surface, so that the corresponding light is applied to substantially the entire body or to at least to the part be stimulated. In addition to the use for performance increase and for improved regeneration, acute sports injuries can also be conservatively treated with the present device in connection with a therapy apparatus. Here, application time periods between 5 and 20 minutes can be established as application routines. Without being bound to the theory, it is assumed that, by the near-infrared radiation, the effects of the biostimulating phototherapy penetrate farther into the body and also develop an effect in the subcutaneous tissue, the connective tissue and the skeletal muscles. Here, in comparison to conventional infrared irradiation, no thermal heating of the skin is generated. By the connection of the device for biostimulating phototherapy to a therapy apparatus, the treatment time periods and the treatment intensities can be adapted to one another. Thus, for example, the application routine can include intervals in which intensive treatment time periods and regeneration time periods can alternate. It was entirely surprising to find synergies to the effect that an easing, i.e. relaxing, of the physical actions via the massage tables, with simultaneous increase of the intensity of the biostimulating phototherapy, can achieve a positive effect over the treatment time period. Alternatively, it is also possible to synchronise the intensive phases of the physical treatment, i.e., the massage intensity, with intensive phases of the exposure of the biostimulating phototherapy.

Example 2

Cosmetic Supplementary Biostimulating Phototherapy

Analogously to Example 1 above, in addition to a basic therapeutic method which is carried out by means of a therapy apparatus via physical action on the therapy recipient, a supplementary biostimulating phototherapy is carried out. The device as described above can be used here.

In the present example, the work is done likewise with light in the long-wavelength visible and near-infrared range. Preferably, this involves wavelengths between 570 nm and 850 nm. In the present application example, the light-emitting units are designed to be oriented directly onto a skin surface to be cosmetically treated. For this purpose, the light-emitting units can be fitted, for example, with reflectors or guided with light wave guides so that they are able to achieve direct and intensive application onto a certain tissue. Cosmetic treatments with light of the mentioned wavelengths can, for example, lead to increased formation of structural proteins such as collagen, elastin and hyaluronic acid (without being bound to this theory). Thereby, the tissue appearance is generally tighter and wrinkle formation regresses. Thus, such treatments can also be used to treat scar tissue as well as pigment disorders which, for example, can occur after the removal of tattoos. In connection with a hydromassage table, the treatment overall can be of greater use for the therapy recipient or a more relaxing and better tolerated treatment can be achieved.

Example 3

Applications with Low-Power Laser Therapy

For the execution of applications by means of light-emitting units, which involve low-level lasers, such lasers are commercially available. As an example, the Lastronic MED-701 is mentioned here as a suitable therapy laser. For the purpose of the present invention, these apparatuses should be provided with an additional connection possibility for the module interfaces. Such apparatuses are used by physical therapists, dentists, dermatologists and rheumatologists as well as by veterinarians, in order to treat a broad spectrum of acute and chronic diseases. Accordingly, the application is described here only in connection with the therapy apparatus as inventive subject matter, since the selection of the specific laser therapy apparatuses should occur in accordance with the intended treatment.

In the present example, these apparatuses are placed by means of a cable in the treatment area and connected via the cable to the module interface and to the control unit. The treatment area then includes an additional therapy apparatus which is capable of triggering a physical therapy. For the purpose of an example, a therapy bath in concentrated salt solution is mentioned here. Such baths are, for example, suitable for generating a feeling of weightlessness in the therapy recipient. Thereby, muscle tensions can be released. In addition, the high salt concentration of the bath has a skin care effect. In the present example, in the therapy area, that is to say in the area of the therapeutic tub filled with the salt solution, in which the therapy recipient moves, multiple LLLT apparatuses can be attached. These apparatuses can be secured by clips on corresponding sites of the body, for example, the ear lobes. The purpose of these LLLT apparatuses is to supplement the relaxation effect of the salt bath with additional acupuncture treatments via the laser. For this purpose, a treatment duration can be established and an application routine which is adapted to this treatment duration can be designed by a control unit of a device for biostimulating phototherapy. Thus, for example, corresponding pulsed light emissions by the laser can enable an acupuncture treatment as a supplement to the bath. This can have a considerable additional psychosomatic and positive effect on the ability of the therapy recipient to relax.

Example 4

Stress Treatment

In an alternative treatment targeting wellness rather as opposed to Example 1 above, the light-emitting units can be designed to emit a spectrum corresponding to daylight. In a specific example, this spectrum can be limited to wavelengths which correspond to natural light occurring on the forest floor of a forest. In forests, due to the tree canopy, a substantial portion of the light is filtered out. The corresponding composition of the light in forests demonstrably has a particularly relaxing effect on peoples' mood. In connection with a therapy apparatus such as the massage table described at the start, a particularly relaxing session can be achieved when the massage table additionally generates a corresponding forest spectrum by means of lamps. For this purpose, for example, light spectra whose wavelengths are correspondingly limited to those filtered by leaf green can be used. Additionally, such devices can also be provided with loudspeakers generating corresponding forest sounds and thus improving the immersion of the therapy recipient in the relaxation.

Example 5

Preconditioning/Postconditioning

In this application of the teaching according to the invention, the application routine is adapted to a tanning session in a UV tanning apparatus. In this example, the therapy unit is a UV tanning apparatus. The device according to the invention for biostimulating phototherapy is operatively connected via a core interface to a processor of a UV tanning apparatus. Thereby, the control receives apparatus parameters as well as treatment parameters of a given tanning session.

A control unit of the device is designed to output an application routine correspondingly adapted to the tanning session. In the present case, the tanning routine could be adapted, for example, to the selected duration and intensity of the tanning session. In the quite specific example, the application routine could comprise a first spectrum used for preparing the skin for the tanning session and having a time period of 3 minutes. This preconditioning application routine could have a spectrum whose peaks are predominantly in the red and/or in the near-infrared range. Subsequently, for the UV treatment, UV, blue light and NIR light sources can be added, and their output could be increased stepwise until it reaches their maximum output after 2 minutes (total 5 minutes).

In the tanning session itself, all the light-emitting units, those of the device as well as those of the therapy apparatus, are active. In the specific example, the tanning lasts approximately 18 minutes. After a UV irradiation has occurred, a postconditioning application routine can be output, which provides for downward dimming of the UV and blue light sources, while the red and near-infrared range sources remain active as before. Alternatively, a blue light source which could have, for example, an activating effect and a time period of 5 minutes could be used. For the example described here, the red light source could be operated pulsed. The pulsing can occur in the frequencies 97 Hz or 194 Hz or 388 Hz.

For the person skilled in the art, the selected time periods as well as the spectra of the application routines in the context of the present invention can be adapted, on the one hand, to the desired biostimulation and, on the other hand, to the type of the session; thus, for example, the peak region of the preconditioning application routine and/or the peak region of the postconditioning application routine and the respective duration can be adapted.

In particular, if LEDs are used as light-emitting units, by way of the composition of the diodes in an array and/or via doping and/or coatings and diffusors, the light spectra can be adapted to multiple application sectors. For the control of the intensity of the LEDs, via control signals of an apparatus control unit, a current output value of the power supply units is varied. Alternatively or additionally, LEDs connected to form arrays which can be operated at a constant voltage of 24 V can be modulated. This voltage is varied by means of a pulse width modulation (PWM) in terms of its intensity. The PWM control signals are generated by a light controller circuit board which communicates with the control unit of the apparatus via a bus system.

The invention provides a device, a method, a therapy apparatus fitted with a corresponding device as well as computer program product for operating the method which remedies at least one disadvantage of those that are known. Provided as such, they can be used versatilely due to their high modularity and enable supplementing existing therapy devices, which are often very expensive to procure, with the corresponding devices. Flexibly designed interfaces enable the use of different treatment forms both in terms of the therapy apparatuses and also by means of biostimulating phototherapy.

Synergistic and pleasant effects are possible if application routines of biostimulating phototherapy are carried out in accordance with a therapy apparatus.

The invention claimed is:

1. A device for biostimulating phototherapy, in particular for supplementary biostimulating phototherapy in conjunction with a therapy apparatus, comprising:
   a. at least one first light-emitting unit for directly and/or indirectly applying light of a first wavelength to at least one part of a human or animal body;
   b. a control unit for outputting application routines;
   c. a module interface for operatively connecting the control unit to the at least one first light-emitting unit, in particular to a plurality of light-emitting units, and
   d. a core interface for operative connection to a therapy apparatus, the therapy apparatus configured to apply physical force to the at least one part of a human or animal body, and characterised in that:
   the control unit is designed to receive data from the therapy apparatus via the core interface while the therapy apparatus is applying physical force to the at least one part of a human or animal body and, on the basis of the data from the therapy apparatus, to control the output of an application routine via the module interface to the at least one first light-emitting unit, wherein the data from the therapy apparatus is indicative of parameters of treatment delivered by the therapy apparatus and wherein the application routine from the at least one first light-emitting unit and the physical force from the therapy apparatus are different and applied to the at least one part of a human or animal body simultaneously.

2. The device of claim 1, wherein the device comprises a plurality of light-emitting units for directly and/or indirectly applying light of a wavelength to at least one part of a human or animal body.

3. The device of claim 2, wherein the module interface is designed for operatively connecting the control unit to the plurality of light-emitting unit(s) for directly and/or indirectly applying light of a first wavelength to at least one part of a human or animal body.

4. The device of claim 2, wherein the plurality of light-emitting units for directly and/or indirectly applying light of a wavelength to at least one part of a human or animal body are configured so that they comprise light-emitting units which each generate different wavelengths, in particular different wavelengths for generating different biostimulating phototherapies.

5. The device of claim 4, wherein the light-emitting units which each generate different wavelengths each comprise a separate module interface for the respective biostimulating phototherapy.

6. The device of claim 1, wherein an application routine is designed to be emitted via the at least one light-emitting unit and/or the plurality of light-emitting units as light spectrum, in particular a light spectrum comprising light with a wavelength between 380 and 780 nm.

7. The device of claim 6, wherein the light spectrum consists of light of different wavelengths and relative intensity, in particular wherein the light spectrum comprises a proportion of relative intensity of at most 25% light of a wavelength between 380 and 400 nm and at most 50% light of a wavelength between 500 and 550 nm, or wherein the light spectrum comprises a proportion of relative intensity of at least 75% light of a wavelength between 380 and 450 nm and at most 50% light of a wavelength of 650 nm.

8. The device according to claim 1, wherein the application routine comprises applying light to at least one part of a human or animal body over a time period, in particular over a time period determined by the control unit by means of the data which are received via the core interface.

9. The device of claim 1, wherein the control unit is designed to take into consideration additional data selected from the group consisting of time-of-day data, weather data, patient data, apparatus data, etc., for outputting application routines.

10. The device of claim 1, comprising an input apparatus for acquiring input data, and wherein the control unit is designed to take into consideration the input of data for outputting application routines.

11. The device of claim 1, comprising a biosensor for acquiring physiological parameters of a patient, in particular a non-invasive biosensor.

12. The device of claim 1, wherein the light-emitting unit(s) comprise(s) light-emitting diodes, in particular wherein the light-emitting unit(s) comprise(s) light-emitting diodes designed by doping to emit light of a certain wavelength.

13. The device of claim 1, also comprising a securing means for securing the device on a therapy apparatus.

14. The device of claim 1, wherein the light-emitting unit(s) is (are) designed to emit substantially no light of a wavelength of less than 380 nm, in particular to comprise a relative intensity of UV radiation in their spectrum of less than 3%.

15. The device of claim 1, also comprising a network interface for connecting the control unit to a computer network and/or to one or more additional devices according to claim 1.

16. The device of claim 1, comprising a memory unit for storing the data and/or application routines.

17. The device of claim 1, wherein the light-emitting unit is designed to apply light of high intensity to at least one part of a human or animal body, and in particular in a certain frequency range.

18. A therapy apparatus for physical treatment of a patient and wherein the therapy apparatus is fitted with supplementary biostimulating phototherapy, comprising:
  (a) a therapy unit for generating external stimulation for therapeutic purposes, and at least one
  (b) device of claim 1 for biostimulating phototherapy.

19. The therapy apparatus of claim 18, wherein the therapy apparatus comprises a plurality of (b), and the devices are networked so that they are designed for the networked output of application routines.

20. The therapy apparatus of claim 18, wherein the therapy unit is a UV tanning apparatus designed to achieve a skin tanning effect by irradiation, and the device for biostimulating phototherapy is designed to output an application routine via the control unit, an application routine which comprises a preceding run and/or a following run, in particular the application routine has a preceding run between one and five minutes with a spectrum between 780 nm and 1400 nm and a following run between 1 and 5 min with a spectrum between 780 nm and 1400 nm.

21. The therapy apparatus of claim 20, wherein the light-emitting unit is designed for emitting pulsed light, wherein the pulsing is preferably carried out with a frequency range between 90 and 400 Hz, particularly preferably wherein the pulsing has a frequency selected from the group consisting of 97 Hz, 194 Hz, or 388 Hz.

22. A method for operating the device of claim 1 for supplementary biostimulating phototherapy in conjunction with a therapy apparatus, comprising the steps of:
  a. receiving data from a therapy apparatus connected via a core interface;
  b. processing the received data for outputting an application routine, wherein the application routine is designed to be carried out by at least one light-emitting unit for applying light of a first wavelength to at least one part of a human or animal body, and wherein
  c. the received data comprise information on at least one of the following variables: time course of a therapy session, treatment goal of a therapy session, number and duration of any therapy sessions that have already occurred, medical condition of the therapy recipient before, after and during the therapy session, emotional state of the therapy recipient before, after and during the therapy session, and characterized in that
  the application routine is output on the basis of the received data.

23. A computer program product for executing the method of claim 22, if it is executed on a computer for controlling a device for biostimulating phototherapy, in particular for supplementary biostimulating phototherapy in conjunction with a therapy apparatus.

24. A method for operating a device according to claim 1, wherein the device is a device for supplementary biostimulating phototherapy in conjunction with a therapy apparatus, wherein the therapy apparatus comprises a therapy unit which is a UV tanning apparatus designed to achieve a skin tanning effect by irradiation,
  the method comprising the steps of:
  a. outputting an application routine which is emitted in the form of a light program via at least one and/or a plurality of light-emitting units as light spectrum, and which comprises applying light to at least one part of a human or animal body over a time period, and wherein
  b. the time period comprises a run preceding and a run following the therapy duration.

25. The method of claim 24, wherein the application routine comprises applying light spectra during the preceding run and/or the following run, the peaks of which are primarily in the red and/or in the near-infrared range.

* * * * *